Feb. 17, 1931. C. LANGNER 1,792,591
PACKING DEVICE FOR ENGINES
Filed Oct. 2, 1928
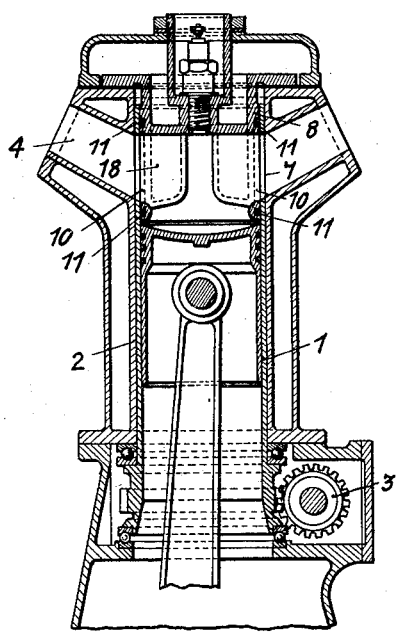
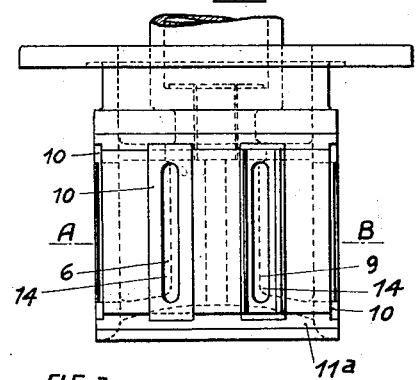
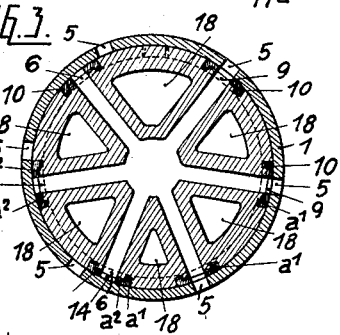
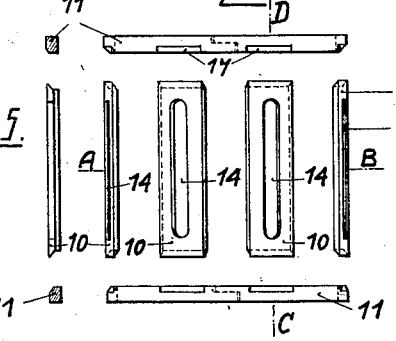
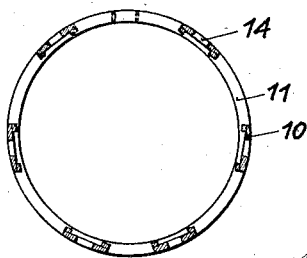
Inventor:
Curt Langner Patented Feb. 17, 1931

1,792,591

UNITED STATES PATENT OFFICE

CURT LANGNER, OF DRESDEN, GERMANY

PACKING DEVICE FOR ENGINES

Application filed October 2, 1928, Serial No. 309,852, and in Germany August 14, 1928.

This invention relates to a packing device for engines provided with a rotating or oscillating valve which simultaneously forms the path of the piston.

One form of the invention is illustrated in the accompanying drawings, in which Figure 1 is a longitudinal section of a four stroke internal combustion engine; Fig. 2, a view of the pulled-out cylinder head carrying the packing units and rings; Fig. 3, a section of the cylinder head on the line A—B and, simultaneously, of the valve so that the slots 5 are visible; Fig. 4, a view of the packing units and rings removed from the cylinder head; Fig. 5, a section of rings and a packing unit on the line C—D; and Fig. 6, a section of Fig. 4 on the line A—B.

The valve 1 is a cylinder comprising several slots 5 parallel to its axis and cooperating to the extent of one-twelfth in the rotation of the crank shaft. The valve 1 is driven by the helical gear or worm 3 which in turn is rotated by the crank shaft by means of a chain or spur gear. During the suction stroke the valve connects the slots 4 of the outer cylinder 2 with the slots 6 in the cylinder head 8 and, during the exhaust stroke, the slots 7 of the outer cylinder 2, with the slots 9 of the cylinder head 8. The slots 5 of the valve 1, which are considerably heated during the exhaust stroke, are cooled down again during suction so that overheating of the exhaust side and deforming of the valve are effectively prevented. To prevent the stressed gases in the cylinder from escaping, which they have a tendency to do, the slots 6 and 2 in the cylinder head 8 are each provided with a packing unit 10 whose slot 14 coincides with the slots 6 and 9. The packing units 10, in connection with the rings 11, are arranged on the same plane and hug the valve 1 gas-tight, or several rings engaging one another in stepped relation with staggered ends may be employed. This arrangement prevents the rings from working their way into the valve owing to their tension and the rotation of the valve. The packing units 10 are executed so that they are placed on each side of the slots 6 and 9 in a groove $a1$ and overlap the edge $a2$ between the groove $a1$ and the slots 6 and 9 in order to limit exactly the admission and exhaust times. Moreover, this arrangement makes it possible to adapt the timing of admission and exhaust to the desired maximum speed of the machine simply by replacing the packing units by others provided with corresponding slots. At each suction and exhaust stroke the valve 1 opens simultaneously several slots which together provide a large passage, the largest passage being quickly opened and closed. The recess 17 of the rings 11 must be broader than the packing unit 10 so that the latter as well as the rings can catch up with wear. The entire circumference of the rings may be chamfered and the slots 6 and 9 in the cylinder head 8 reach to the center of the latter, as shown in Fig. 3, so that they radiate from it, which results in thorough whirling of the material brings the cooling water down to the lowest points of the slots. The cylinder head may also be executed downwardly as cylinder and path for the piston so that the valve moved between two fixed cylinders. The object of the invention is suited for high speed internal combustion engines, compressed air, steam and hydraulic machines and pumps and, owing to the elimination of oscillating and jarring parts, produces noiseless running.

The invention further eliminates the so-called "servo effect" which means that a relatively small primary expenditure of force results automatically in a larger secondary effect, and this effect or principle is widely made use of in mechanics and especially in braking devices. For example, the elastic rings 11 of the present invention press moderately against the rotary valve, which is the "primary" effect. The friction produced thereby tends to rotate the rings also which, however, are fixed in their grooves. This friction increases the moderate pressure in that portion of the rings lying opposite to the direction of rotation of the valve, which is the "secondary" effect and which may be disproportionally large so that the rings work themselves rapidly into the rotary valve or will even break. In the invention, this is prevented by causing the packing units to hug with their very large bearing surface the rotary valve and to neutralize thereby the secondary effect referred to above so that uniform contact of the entire packing outfit is insured, which constitutes an improvement over the existing types of packing devices.

I claim:—

Packing device for engines provided with a ported rotary sleeve valve, comprising slotted packing units carried by a cylinder head extending into the rotary valve, a groove in said head for receiving the said packing units, and concentric elastic rings also in said head adapted to prevent leakage in axial direction and to be pressed against the rotary valve, the said slot packing overlapping the edge between the slots and the groove to cooperate with the slots in controlling admission and exhaust and being further disposed to prevent the development of a "servo effect" between the elastic rings and the rotary sleeve valve to insure uniform contact of the entire packing device with the rotary sleeve valve.

In testimony whereof I have affixed my signature.

CURT LANGNER.